United States Patent
Chen et al.

(10) Patent No.: US 10,227,484 B2
(45) Date of Patent: Mar. 12, 2019

(54) FLUOROTHERMOPLASTIC POLYMER COMPOSITIONS

(71) Applicant: 3M INNOVATIVE PROPERTIES COMPANY, St. Paul, MN (US)

(72) Inventors: Lisa P. Chen, St. Paul, MN (US); Klaus Hintzer, Kastl (DE); Harald Kaspar, Burgkirchen (DE); Kai H. Lochhaas, Neuotting (DE); Mark W. Muggli, Emmerting (DE); Jens Schrooten, Muehldorf am Inn (DE); Allen M. Sohlo, Lindstrom, MN (US); Helmut Traunspurger, Julbach (DE); Karl D. Weilandt, Afton, MN (US); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/503,098

(22) PCT Filed: Aug. 13, 2015

(86) PCT No.: PCT/US2015/044964
§ 371 (c)(1),
(2) Date: Feb. 10, 2017

(87) PCT Pub. No.: WO2016/028582
PCT Pub. Date: Feb. 25, 2016

(65) Prior Publication Data
US 2017/0226336 A1 Aug. 10, 2017

Related U.S. Application Data

(60) Provisional application No. 62/040,555, filed on Aug. 22, 2014.

(51) Int. Cl.
*C08F 214/16* (2006.01)
*C08F 214/22* (2006.01)
(Continued)

(52) U.S. Cl.
CPC ............... *C08L 27/18* (2013.01); *B32B 1/08* (2013.01); *B32B 7/12* (2013.01); *B32B 25/08* (2013.01);
(Continued)

(58) Field of Classification Search
None
See application file for complete search history.

(56) References Cited

U.S. PATENT DOCUMENTS

| | | | |
|---|---|---|---|
| 4,743,658 A | 5/1988 | Imbalzano | |
| 6,117,508 A | 9/2000 | Parsonage | |

(Continued)

FOREIGN PATENT DOCUMENTS

| | | |
|---|---|---|
| EP | 0222945 | 5/1987 |
| EP | 0992518 | 4/2000 |

(Continued)

OTHER PUBLICATIONS

Technical Information sheet for Dyneon FEP 6307, 3M, Dec. 2005. (Year: 2005).*

(Continued)

*Primary Examiner* — Richard A Huhn
(74) *Attorney, Agent, or Firm* — Julie Lapos-Kuchar

(57) ABSTRACT

Described herein is a composition comprising (i) a hydrofluorothermoplastic polymer, wherein the hydrofluorothermoplastic polymer is derived from: (a) 50-85 mol % tetrafluoroethene; (b) 2-15 mol % hexafluoropropene; (c) 10-35 mol % vinylidene fluoride; and (d) 0.1 to 5 mol % of a bromine-containing monomer; and (ii) a perhalogenated thermoplastic polymer. Such compositions can be used in (Continued)

multilayer constructions in, for example, fuel hose applications.

17 Claims, 1 Drawing Sheet

(51) Int. Cl.
    *C08F 214/26* (2006.01)
    *C08F 214/28* (2006.01)
    *C08L 27/18* (2006.01)
    *C08L 27/16* (2006.01)
    *C08L 27/20* (2006.01)
    *B32B 27/30* (2006.01)
    *B32B 27/20* (2006.01)
    *B32B 7/12* (2006.01)
    *B32B 25/12* (2006.01)
    *B32B 1/08* (2006.01)
    *B32B 25/14* (2006.01)
    *B32B 25/08* (2006.01)
    *B32B 27/32* (2006.01)

(52) U.S. Cl.
    CPC .............. *B32B 25/12* (2013.01); *B32B 25/14* (2013.01); *B32B 27/20* (2013.01); *B32B 27/304* (2013.01); *B32B 27/322* (2013.01); *C08L 27/16* (2013.01); *C08L 27/20* (2013.01); *C08F 214/16* (2013.01); *C08F 214/22* (2013.01); *C08F 214/222* (2013.01); *C08F 214/26* (2013.01); *C08F 214/262* (2013.01); *C08F 214/28* (2013.01); *C08F 214/282* (2013.01)

(56) References Cited

U.S. PATENT DOCUMENTS

| | | | |
|---|---|---|---|
| 6,242,548 B1 | 6/2001 | Duchesne | |
| 6,429,258 B1 | 8/2002 | Morgan | |
| 6,541,588 B1 | 4/2003 | Kaulbach | |
| 6,583,226 B1 | 6/2003 | Kaulbach | |
| 6,686,426 B2 | 2/2004 | Kaulbach | |
| 6,849,314 B2 * | 2/2005 | Jing | B32L 327/08 138/124 |
| 6,864,336 B2 | 3/2005 | Kaspar | |
| RE40,902 E | 9/2009 | Kaulbach | |
| 7,671,112 B2 | 3/2010 | Hintzer | |
| 2002/0028886 A1 | 3/2002 | Abe | |
| 2003/0198770 A1 | 10/2003 | Fukushi | |
| 2007/0015937 A1 | 1/2007 | Hintzer | |
| 2007/0208137 A1 | 9/2007 | Kaspar | |
| 2011/0040021 A1 | 2/2011 | Kaspar | |
| 2012/0129982 A1 * | 5/2012 | Zipplies | C08F 14/18 524/58 |

FOREIGN PATENT DOCUMENTS

| | | |
|---|---|---|
| EP | 1741732 | 1/2007 |
| EP | 2077285 | 7/2009 |
| EP | 2284200 | 2/2011 |
| EP | 2412735 | 2/2012 |
| WO | WO 2002-44265 | 6/2002 |
| WO | WO 2002-088207 | 11/2002 |
| WO | WO 2003-028995 | 4/2003 |
| WO | WO 2004/011543 | 2/2004 |
| WO | WO 2004-024786 | 3/2004 |
| WO | WO 2009-009361 | 1/2009 |
| WO | WO 2014-088804 | 6/2014 |
| WO | WO 2014-088820 | 6/2014 |
| WO | WO 2016-028539 | 2/2016 |

OTHER PUBLICATIONS

International Search Report for PCT International Application No. PCT/US2015/044964 dated Nov. 23, 2015, 3 pages.

* cited by examiner

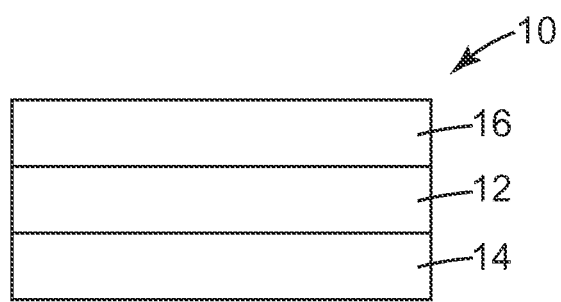

FLUOROTHERMOPLASTIC POLYMER COMPOSITIONS

CROSS REFERENCE TO RELATED APPLICATIONS

This application is a national stage filing under 35 U.S.C. 371 of PCT/US2015/044964, filed Aug. 13, 2015, which claims the benefit of U.S. Application No. 62/040,555, filed Aug. 22, 2014, the disclosure of which is incorporated by reference in its/their entirety herein.

TECHNICAL FIELD

A composition comprising a hydrofluorothermoplastic polymer and a perhalogenated thermoplastic polymer is described along with multilayer articles therefrom and a method of making the composition. The composition has good adhesion characteristics and/or low permeability to gasoline.

BACKGROUND

Growing environmental awareness has led to interest in controlling fuel volatility, which has raised the need in the automotive industry for materials having good fuel-barrier properties. Common rubber hoses for fuel transfer are laminate hoses comprising an elastomer (or rubber) and a barrier layer made of a fluoropolymer for enhancing the fuel permeability resistance. Interest and demand for a reduction in environmental loads has raised the need for lower fuel permeability of the barrier layer. The thickness of the barrier layer has been increased and various fluoropolymers have been considered to ensure lower release of fuel vapors. However, the increase in the barrier layer thickness leads to an increase in the hose weight and is disadvantageous from a cost standpoint. Additionally, bendability (flexibility) of the hose is lowered, which is disadvantageous in terms of handleability and assembly. In the case of the fluoropolymers, perfluorinated (fully fluorinated) polymers have been considered because they have low fuel permeability values. However, when perfluorinated polymers are used as a barrier layer, the barrier layer is not easily adhered to the other polymer layers of a multilayer article (e.g., hose). Thus, additional steps such as a surface treatment of the fluoropolymer for improving the adhesiveness, the use of tie layers, and/or winding a film or tape around the fluoropolymer layer can be used. These additional steps lower the productivity and also increase the cost of the finished good, which are disadvantageous.

SUMMARY

There is a desire to identify a fluorothermoplastic polymer showing low fuel permeation and good adhesion characteristics so that it can be utilized, for example, in multilayer laminate constructions.

In one aspect, a composition is provided comprising (i) a hydrofluorothermoplastic polymer, wherein the hydrofluorothermoplastic polymer is derived from:
  (a) 50-85 mol % tetrafluoroethene;
  (b) 2-15 mol % hexafluoropropene;
  (c) 10-35 mol % vinylidene fluoride; and
  (d) 0.1 to 5 mol % of a bromine-containing monomer; and
(ii) a perhalogenated thermoplastic polymer having a melting point of 150 to 315° C. with the ratio of the hydrofluorothermoplastic polymer to the perhalogenated thermoplastic polymer on a mass-to-mass basis is between 10:90 and 90:10.

In another aspect, a multilayer article is provided comprising:
(i) a first polymer layer comprising a composition comprising a hydrofluorothermoplastic polymer and a perhalogenated thermoplastic polymer, wherein the hydrofluorothermoplastic polymer is derived from:
  (a) 50-85 mol % tetrafluoroethene;
  (b) 2-15 mol % hexafluoropropene;
  (c) 10-35 mol % vinylidene fluoride; and
  (d) 0.1 to 5 mol % of a bromine-containing monomer and the perhalogenated thermoplastic polymer has a melting point of 150 to 315° C. with the ratio of the hydrofluorothermoplastic polymer to the perhalogenated thermoplastic polymer on a mass-to-mass basis is between 10:90 and 90:10; and
(ii) a second polymer layer wherein the second polymer layer is an elastomer
wherein the first polymer layer is in intimate contact with the second polymer layer.

In yet another aspect, a method of making the composition is provided comprising,
(i) providing a first latex comprising a fluorothermoplastic polymer derived from:
  (a) 50-85 mol % tetrafluoroethene;
  (b) 2-15 mol % hexafluoropropene;
  (c) 10-35 mol % vinylidene fluoride; and
  (d) 0.1 to 5 mol % of a bromine-containing monomer; and
(ii) providing a second latex comprising a perhalogenated thermoplastic polymer having a melting point of 150 to 315° C.;
(iii) combining the first latex and the second latex to form a latex blend; and
(iv) further processing the latex blend to form a dry powder.

In yet another aspect, a method of making a composition is provided comprising:
(i) providing a first polymer comprising a fluorothermoplastic polymer derived from:
  (a) 50-85 mol % tetrafluoroethene;
  (b) 2-15 mol % hexafluoropropene;
  (c) 10-35 mol % vinylidene fluoride; and
  (d) 0.1 to 5 mol % of a bromine-containing monomer; and
(ii) providing a second polymer comprising a perhalogenated thermoplastic polymer having a melting point of 150 to 315° C.; and
(iii) combining the first polymer and the second polymer to form a mixture; and
(iv) melting the mixture to form a melt blend.

In still another aspect, a method of making a composition is provided comprising:
(i) providing a core comprising a perhalogenated thermoplastic polymer having a melting point of 150 to 315° C.;
(ii) polymerizing around the core, a shell comprising a fluorothermoplastic polymer derived from:
  (a) 50-85 mol % tetrafluoroethene;
  (b) 2-15 mol % hexafluoropropene;
  (c) 10-35 mol % vinylidene fluoride; and
  (d) 0.1 to 5 mol % of a bromine-containing monomer.

In another aspect, a method of making a composition is provided comprising:
(i) providing a core comprising a fluorothermoplastic polymer derived from:
  (a) 50-85 mol % tetrafluoroethene;
  (b) 2-15 mol % hexafluoropropene;
  (c) 10-35 mol % vinylidene fluoride; and
  (d) 0.1 to 5 mol % of a bromine-containing monomer (ii) polymerizing around the core, a shell comprising a perhalogenated thermoplastic polymer having a melting point of 150 to 315° C.

The above summary is not intended to describe each embodiment. The details of one or more embodiments of the invention are also set forth in the description below. Other features, objects, and advantages will be apparent from the description and from the claims.

BRIEF DESCRIPTION OF THE DRAWINGS

In the accompanying drawing:
FIG. 1 is a cross-sectional view of multilayer article 10.

DETAILED DESCRIPTION

As used herein, the term
"copolymer" refers to a polymer comprising repeating units derived from the recited monomers (comonomers) without excluding the option of other repeating units being present that derive from other monomers not explicitly recited;

"monomer" is a molecule which can undergo polymerization which then forms part of the essential structure of a polymer; and "perhalogenated" means that any carbon-bonded hydrogen is replaced by a halogen atom such as chlorine or fluorine, and when all carbon-bonded hydrogens are replaced with a fluorine atom, the term "perfluorinated" is used;

"polymer" refers to a macrostructure having a number average molecular weight ($M_n$) of at least 50,000 dalton, at least 100,000 dalton, at least 300,000 dalton, at least 500,000 dalton, at least 750,000 dalton, at least 1,000,000 dalton, or even at least 1,500,000 dalton and not such a high molecular weight that it inhibits melt-processing of the polymer.

"a", "an", and "the" are used interchangeably and mean one or more; and

"and/or" is used to indicate one or both stated cases may occur, for example A and/or B includes (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Compositions

The present application is directed toward a novel composition comprising (i) a hydrofluorothermoplastic polymer derived from bromine-containing monomers and (ii) a perhalogenated thermoplastic polymer. (U.S. Pat. Publ. No. 2017-0226337, Chen et al., herein incorporated by reference) discloses the use of a brominated monomer in the hydrofluorothermoplastic polymer to form a fluoropolymer that has good adhesion to other materials, while also having low fuel permeation. In the present application, this hydrofluorothermoplastic polymer is used along with a perhalogenated thermoplastic polymer to form a fluorinated thermoplastic which has improved adhesion to other materials, while also having low fuel permeation, making these fluorinated thermoplastic compositions especially useful in hose applications.

The hydrofluorothermoplastics comprise at least one carbon-hydrogen bond and at least one carbon-fluorine bond in the polymer backbone. The hydrofluorothermoplastic polymer of the present disclosure comprises:

(a) at least 50, 60, 65, 68, 70, or even 75 mol %; and no more than 85, 84, 82, or even 80 mol % of tetrafluoroethene based on the total moles of monomer used;

(b) at least 2, 3, 4, 6, or even 8 mol %; and no more than 15, 12, 11, or even 10 mol % of hexafluoropropene based on the total moles of monomer used;

(c) at least 10, 12, 14, 16, 18, or even 20 mol %; and no more than 35, 30, 28, 26, or even 24 mol % of vinylidene fluoride based on the total moles of monomer used;

(d) at least 0.1, 0.2, 0.4, 0.6, 0.8, or even 1 mol %; and no more than 5, 4.5, 4, 3.5, 3, 2.5, or even 2 mol % of a bromine-containing monomer based on the total moles of monomer used; and (e) optionally, at least 0.1, 0.2, 0.3, 0.4, 0.5 or even 0.6 mol %; and no more than 5, 4, 3.8, 3.7, 3.6, or even 3.5 mol % of a fluorinated allyl and/or vinyl ether monomer based on the total moles of monomer used.

The bromine-containing monomer may be fluorinated (partially fluorinated or fully fluorinated) or non-fluorinated. The bromine-containing monomers disclosed herein correspond to the general formula:

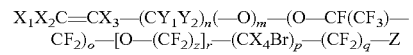

wherein $X_1$, $X_2$, $X_3$, $X_4$, $Y_1$, and $Y_2$ are independently selected from H, F, and $CF_3$; Z represents Br or F; n, o, p, and r are independently 0, 1, 2, or 3; m is 0 or 1; q is 0, 1, 2, 3, 4, or 5; z is 0, 1, 2, 3, 4, or 5. Exemplary bromine-containing monomers include: $F_2C=CHBr$ (BDFE), $F_2C=CFBr$ (BTFE), $H_2C=CH-CF_2-CF_2-Br$ (BTFB), $H_2C=CH-CF_2-Br$, $F_2C=CF-O-(CF_2)_{2-5}-Br$, $F_2C=CF-O-CF(CF_3)-CF_2-O-(CF_2)_{2-5}-Br$, $F_2C=CF-CF_2-O-(CF_2)_{2-5}-Br$, $H_2C=CH-CH_2-Br$, $F_2C=CF-O-CF_2-CFBr-CF_3$, and combinations thereof.

These bromine-containing monomers disclosed above are sometimes referred to as cure-site monomers, which are added to elastomeric compositions to provide sites for subsequent crosslinking. When making an elastomer, the polymerized elastomeric gum (coagulated polymer) containing the incorporated cure site monomers, is subjected to a crosslinking step involving a cure system (e.g., peroxide, bisphenol, etc.) which results in the linking of polymer chains and the formation of the elastomer. In the present disclosure, the resulting fluorothermoplastic does not comprise a subsequent crosslinking step. Surprisingly, it has been found that by incorporating these bromine-containing monomers to a fluorothermoplastic composition improved adhesion is realized.

The hydrofluorothermoplastic polymer may be linear or branched. In one embodiment, the hydrofluorothermoplastic polymer is linear showing a relaxation exponent, described in U.S. Pat. Publ. Nos. 2011/0040021 and 2007/0208137, of n≥0.93. Alternatively, in one embodiment, the hydrofluorothermoplastic polymer comprising branching has a relaxation exponent of n<0.93.

The hydrofluorothermoplastic polymer has a melting point of at least 150° C., 175° C., 200° C., or even at least 225° C. and typically no more than 290° C. The melting point is preferred to be between 225° C. and 280° C.

In one embodiment, the hydrofluorothermoplastic polymer with a melting point in the range of 150-250° C. has a melt flow rate (MFR) of 1 to 100 g/10 min or even between 3 and 50 g/10 min at 297° C. with a 5 kilogram (kg) load. In another embodiment, the hydrofluorothermoplastic polymer with a melting point above 250° C. has an MFR of 1 to 100 g/10 min or even between 3 and 50 g/10 min at 372° C. with a 5 kg load.

In one embodiment, the hydrofluorothermoplastic polymer has a permeation constant at 60° C. with CE10 fuel of less than 4, 3.5, 3, 2.5, 2.2, 2.0, 1.8, or even 1.6 g mm $d^{-1} \cdot m^{-2}$ when measured as described in the Permeation Testing described in the Example Section.

In the compositions of the present disclosure, the hydrofluorothermoplastic described above is present along with a perhalogenated thermoplastic polymer comprising at least one fluorine atom. The perhalogenated thermoplastic polymer is selected from polymers typically having melting temperatures ranging from at least 150, 165, 170, or even 175° C.; and no more than 320, 315, 310 or even 300° C. Exemplary perhalogenated thermoplastic polymers include: FEP, PFA, homopolymer and/or copolymers comprising CTFE (chlorotrifluoroethene), and blends thereof. FEP (fluorinated ethene propene) is a random copolymer derived from TFE (tetrafluoroethene) and HFP (hexafluoropropene) monomers. The HFP content in FEP ranges from at least 7 mol % to no more than 10 mol %. FEP may, additionally, be derived from perfluoro(vinyl ether) monomers monomers such as perfluoro(methyl vinyl ether) (PMVE), perfluoro (ethyl vinyl ether) (PEVE), and perfluoro(n-propyl vinyl ether) (PPVE-1). The perfluoro(vinyl ether) content in FEP may be up to 1 mol %. The melting point of FEP is in the range of 245° C. to 270° C. PFA (tetrafluoroethene-perfluoroalkoxy) is a random copolymer derived from tetrafluoroethene and perfluoro(vinyl ether) monomers such as perfluoro(methyl vinyl ether) (PMVE), perfluoro(ethyl vinyl ether) (PEVE), and perfluoro(n-propyl vinyl ether) (PPVE-1). The perfluoro(vinyl ether) content in PFA ranges from at least 0.5 or even 1 mol % to no more than 4 or even 3 mol %. The melting point of PFA is in the range of 295 to 315° C. A homopolymer of CTFE is known as PCTFE. Copolymers comprising CTFE include CTFE along with one or more different perhalogenated monomers such as HFP, TFE, perfluoro(vinyl ether), and perfluoro(allyl ether) monomers.

Among the useful combinations in the composition are ratios of the hydrofluorothermoplastic polymer to the perhalogenated thermoplastic polymer of at least 10:90; 20:80; 30:70; or even 40:60; and no more than 90:10; 80:20; 70:30; or even 60:40 based on a mass-to-mass ratio.

In one embodiment, the compositions of the present disclosure are blends of the hydrofluorothermoplastic polymer and the perhalogenated thermoplastic polymer.

In another embodiment, a core-shell composition is described, wherein particles comprising a perhalogenated thermoplastic polymer core are encased with a hydrofluorothermoplastic polymer shell or vice versa.

Blends

In one embodiment of the present disclosure, the polymerized hydrofluorothermoplastic polymer can be blended with the perhalogenated thermoplastic polymer to form the composition. Such blends can consist of mixing a dispersion, for instance an aqueous dispersion, of each of the hydrofluorothermoplastic polymer and the perhalogenated thermoplastic polymer to form a latex blend. This latex blend can then be further processes to form a dry powder using techniques known in the art, for example, coagulating, optionally agglomerating and drying the blend to form a dry powder. In another embodiment, the coagulated dispersions from both the hydrofluorothermoplastic polymer and the perhalogenated thermoplastic polymer can be mixed. The mixing may also be carried out by any of a number of other techniques, including blending the agglomerates of the hydrofluorothermoplastic polymer and the perhalogenated thermoplastic polymer in a mixer. Alternatively, or in addition to the blending disclosed above, the coagulated hydrofluorothermoplastic polymer and the coagulated perhalogenated thermoplastic polymer can be melt blended, e.g. extrusion in a single-screw, or a twin-screw extruder, or in an internal mixer (e.g., a Brabury mixer), which may improve the homogeneity of the blend.

Described below is the polymerization of the hydrofluorothermoplastic polymer.

To polymerize the hydrofluorothermoplastic, the monomers (monomers (a), (b), (c), (d) and optionally (e) described above) are polymerized together using techniques known in the art. In addition to the monomers disclosed above, additional monomers may be used so long as the properties of the hydrofluorothermoplastic polymer are not compromised. Additional monomers include, for example fluorovinyl ether monomers and fluoroallyl ether monomers containing one or more ether linkages such as perfluoro (methyl vinyl ether) (PMVE), perfluoro(ethyl vinyl ether) (PEVE), perfluoro(n-propyl vinyl ether) (PPVE-1), perfluoro(2-propoxypropyl vinyl ether) (PPVE-2), perfluoro(3-methoxy-n-propyl vinyl ether), perfluoro(2-methoxyethyl vinyl ether), perfluoro(methoxymethyl vinyl ether) ($CF_3$—O—$CF_2$—O—CF=$CF_2$), and $CF_3$—($CF_2$)$_2$—O—CF($CF_3$)—$CF_2$—O—CF($CF_3$)—$CF_2$—O—CF=$CF_2$, perfluoro(methyl allyl ether) ($CF_2$=CF—$CF_2$—O—$CF_3$), perfluoro(ethyl allyl ether), perfluoro(n-propyl allyl ether), perfluoro(2-propoxypropyl allyl ether), perfluoro(3-methoxy-n-propyl allyl ether), perfluoro(2-methoxyethyl allyl ether), perfluoromethoxymethyl allyl ether, and $CF_3$—($CF_2$)$_2$—O—CF($CF_3$)—$CF_2$—O—CF($CF_3$)—$CF_2$—O—$CF_2$CF=$CF_2$, and fluorinated, preferably perfluorinated, bisolefinic ethers selected from diallyl ethers, divinyl ethers and allyl vinyl ethers may be used as an additional comonomer, ad combinations thereof.

Exemplary bisolefinic ethers of the general formula:

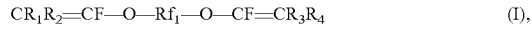

$$CR_1R_2=CF—O—Rf_1—O—CF=CR_3R_4 \quad (I),$$

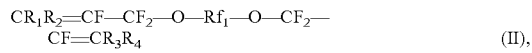

$$CR_1R_2=CF—CF_2—O—Rf_1—O—CF_2—CF=CR_3R_4 \quad (II),$$

or

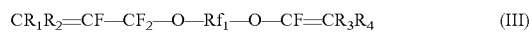

$$CR_1R_2=CF—CF_2—O—Rf_1—O—CF=CR_3R_4 \quad (III)$$

wherein $R_1$, $R_2$, $R_3$ and $R_4$ are independently from each other F, H, alkyl, alkoxy, polyoxaalkyl, perfluoroalkyl, perfluoroalkoxy or perfluoropolyoxaalkyl; Preferably, $R_1$, $R_2$, $R_3$, and $R_4$ are, independently from each other, F, $CF_3$, $C_2F_5$, $C_3F_7$, $C_4F_9$, H, $CH_3$, $C_2H_5$, $C_3H_7$, $C_4H_9$, preferably F. $Rf_1$ represents a residue selected from linear or branched perfluoroalkanediyl, perfluorooxaalkanediyl or perfluoropolyoxaalkanediyl residues or a residue according to $Rf_2$. Preferably, $Rf_1$ contains from 1 to 12, more preferably, from 1 to 10 carbon atoms, more preferably $Rf_1$ is a perfluoroalkanediyl residue having from 1 to 12, or from 2 to 10 or from 3 to 8 carbon atoms. $Rf_2$ is a non-fluorinated, a fluorinated or a perfluorinated arylene. The arylene may be non-substituted or substituted with one or more halogen atoms other than F, perfluorinated alkyl residues, perfluorinated alkoxy residues, perfluorinated oxaalkyl residues, perfluorinated polyoxaalkyl residues, fluorinated, perfluorinated or non-fluorinated phenyl or phenoxy moieties or combinations thereof, wherein the phenyl or phenoxy residues may be non-substituted or substituted with one or more perfluorinated alkyl, alkoxy, oxaalkyl or polyoxaalkyl residue or one or more halogen atoms other than F or combinations thereof. Preferably, $Rf_2$ contains from 1 to 14 carbon atoms, more preferably from 1 to 12, most preferably from 1 to 10 carbon atoms.

Known aqueous polymerization techniques including emulsion polymerization (wherein that polymerization occurs in polymer particles dispersed in water which may be electrostatically stabilized) may be used.

The reactor vessel for use in the polymerization process is typically a pressurizable vessel capable of withstanding the internal pressures during the polymerization reaction. Typically, the reaction vessel will include a mechanical agitator, which will produce thorough mixing of the reactor contents and a heat exchange system. Any quantity of the monomers may be charged to the reactor vessel. The monomers may be charged batch-wise or in a continuous or semi-continuous manner. By semi-continuous is meant that a plurality of batches of the monomer are charged to the vessel during the course of the polymerization. The independent rate at which the monomers are added to the kettle will depend on the consumption rate of the particular monomer with time. Preferably, the rate of addition of monomer will equal the rate of consumption of monomer, that is conversion of monomer to polymer.

The reaction kettle is charged with water, the amounts of which are not critical. To the aqueous phase there is generally also added a surfactant, typically a non-telogenic fluorinated surfactant although aqueous emulsion polymerization without the addition of fluorinated surfactant or non-fluorinated surfactant may also be practiced. Suitable fluorinated surfactants include any fluorinated surfactant commonly employed in aqueous emulsion polymerization.

In one embodiment, a fluorinated surfactant may be used which corresponds to the general formula:

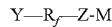

wherein Y represents hydrogen, Cl or F; $R_f$ represents a linear or branched perfluorinated alkylene having 4 to 10 carbon atoms; Z represents $COO^-$ or $SO_3^-$ and M represents a hydrogen ion, an alkali metal ion or an ammonium ion. Such fluorinated surfactants include fluorinated alkanoic acid and fluorinated alkanoic sulphonic acids and salts thereof, such as ammonium salts of perfluorooctanoic acid and perfluorooctane sulphonic acid. Also contemplated for use in the preparation of the polymers described herein are fluorinated surfactants of the general formula:

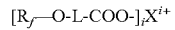

wherein L represents a linear or branched partially or fully fluorinated alkylene group or an aliphatic hydrocarbon group, $R_f$ represents a linear or branched partially or fully fluorinated aliphatic group or a linear or branched partially or fully fluorinated group interrupted with one or more oxygen atoms, $X^{i+}$ represents a cation having the valence i and i is 1, 2 or 3. In one embodiment, the emulsifier is selected from $CF_3$—O—$(CF_2)_3$—O—CHF—$CF_2$—COOH and salts thereof. Specific examples are described in US 2007/0015937, which is incorporated herein by reference. Exemplary emulsifiers include: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2)_2CF_2CF_2CF_2COOH$, $CF_3(CF_2)_2CH_2(CF_2)_2COOH$, $CF_3(CF_2)_2COOH$, $CF_3(CF_2)_2OCF(CF_3)CF_2OCF(CF(CF_3)COOH$, $CF_3(CF_2)_2(OCF_2CF_2)_4OCF(CF_3)COOH$, $CF_3OCF_2CF(CF_3)OCF(CF_3)COOH$, $C_3F_7OCF(CF_3)COOH$, $CF_3CF_2O(CF_2CF_2O)_3CF_2COOH$, and their salts.

Also contemplated for use in the preparation of the hydrofluorothermoplastic polymers described herein are fluorinated polyether surfactants, such as described in U.S. Pat. No. 6,429,258.

In yet another embodiment, polymerizable fluorinated emulsifiers (also referred to as surfmer) according to the following formula can be used in the preparation of the hydrofluorothermoplastic polymers

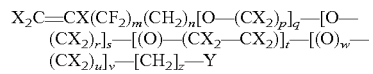

where X is independently selected from H, F, or $CF_3$; Y is COOM or $SO_3M$; wherein the polymerizable fluorinated emulsifier comprises at least 1 fluorine atom. M is H, an alkali metal (e.g., Na, Ca, etc.), or $NH_4$. Subscript m is 0-6, 0-5, 0-4, 0-3, or even 0-2. Subscript n is 0-6, 0-5, 0-4, 0-3, or even 0-2. Subscript p is at least 1, 2, 3, 4, or even 5; and no more than 20, 10, 8, or even 6. Subscript q is 0-6, 0-5, 0-4, 0-3, or even 0-2. Subscript r is 0-6, 0-5, 0-4, 0-3, or even 0-2. Subscript s is 0-6, 0-5, 0-4, 0-3, or even 0-2. Subscript t is 0-6, 0-5, 0-4, 0-3, or even 0-2. Subscript u is 0-6, 0-5, 0-4, 0-3, or even 0-2. Subscript v is 0-6, 0-5, 0-4, 0-3, or even 0-2. Subscript w is 0 or 1. Subscript z is 0-6, 0-5, 0-4, 0-3, or even 0-2. At least one of m, n, q, s, t, u, v, and z is at least 1. These fluorinated emulsifiers are able to be polymerized into the polymer during the polymerization.

Exemplary emulsifiers include fluorinated allyl and vinyl ethers including: $CF_2$=CF—$(CF_2)_m$—O—$(CF_2)_p$—O—$(CF_2)_r$—Y; $CF_2$=CF—$(CF_2)_m$—O—$(CF_2)_p$—$CH_2$—Y; $CF_2CF$—$(CF_2)_m$—O—$(CF_2)_p$—O—$CF(CF_3)$—$CF_2)_t$—O—$CF(CF_3)$—Y; $CF_2$=CF—$(CF_2)_m$—O—$(CF_2)_p$—O—CHF—$CF_2$—Y; and $CF_2$=CF—$(CF_2)_m$—O—$(CF_2)_p$—O—CHF—Y. where Y is COOM or $SO_3M$. M is H, an alkali metal, or $NH_4$. Subscript m is an integer from 0-6. Subscript r is an integer from 0-6. Subscript t is an integer from 0-6. Subscript p is an integer from 1-6. Exemplary emulsifiers also include fluorinated olefins such as:

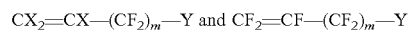

where X is independently selected from H, F, or $CF_3$ and Y is COOM or $SO_3M$. M is H, an alkali metal, or $NH_4$. Subscript m is an integer from 1-6. In one embodiment, at least one of X in the fluorinated olefin is an H. In one embodiment, at least one of X in the fluorinated olefin contains an F atom. These emulsifiers are described in U.S. Pat. Appl. Nos. 61/732,966 and 61/732,967, filed Dec. 4, 2012, herein incorporated by reference.

These fluorinated surfactants may be used alone or in combination as a mixture of two or more of them. The amount of the surfactant is generally within a range of 250 to 5,000 ppm (parts per million), preferably 250 to 2000 ppm, more preferably 300 to 1000 ppm, based on the mass of water to be used.

In one embodiment, the polymerization is substantially free of a fluorinated emulsifier comprising an acid or salt like fluorinated alkanoic acids or salts thereof; fluorinated alkanoic sulphonic acids or salts thereof; fluorinated mono- or dioxaalkanoic acids or salts thereof; or combinations thereof. Such a polymerization may be conducted by means of fluoropolymer seed particles as known in the art. As used here, substantially free of an emulsifier, means less than 0.1%, 0.05%, 0.01%, or even 0.001% by weight of the emulsifier versus the total weight of the dispersion is present, or even no emulsifier is detected in the resulting dispersion.

In one embodiment, a chain-transfer agent may be used to control the molecular weight of the fluoropolymer so as to obtain the desired zero shear rate viscosity and/or to introduce halogen atoms (I or Br) at a terminal position of the polymer chain. Examples of chain-transfer agents include those selected from the group consisting of chlorine-, bromine-, and iodine-containing compounds, alcohols such as isopropyl alcohol, esters such as dimethyl malonate and diethyl malonate, ketones such as acetone, mercaptans such as isooctyl thioglycolate and carbon tetrabromide, amines, alkanes such as ethane or n-pentane, dialkyl ethers such as dimethyl ether, methyl tertiary-butyl ether and mixtures thereof. Exemplary chain-transfer agents include those having the formula $R_fP_x$, wherein P is Br or I, preferably Br, $R_f$ is an x-valent alkyl radical having from 1 to 12 carbon atoms, which optionally may also contain chlorine atoms. Typically, x is 1 or 2. Useful chain-transfer agents include perfluorinated alkyl monoiodide, perfluorinated alkylene diiodide, perfluorinated alkyl monobromide, perfluorinated alkylene dibromide, perfluorinated alkylene monobromide monoiodide, and combinations thereof. Specific examples include $CF_2Br_2$, $Br(CF_2)_2Br$, $Br(CF_2)_4Br$, $CF_2ClBr$, $CF_3CFBrCF_2Br$, $BrCF_2CFBrOR_f$ wherein $R_f$ represents a linear or branched partially or fully fluorinated aliphatic group or a linear or branched partially or fully fluorinated group interrupted with one or more oxygen atoms, Br $(CF_2)_nI$ wherein n is an integer from 1-10 (e.g., $Br(CF_2)_2I$), and combinations thereof. In one embodiment, perfluorinated alkyl dibromides are used.

The polymerization of the hydrofluorothermoplastic polymer is usually initiated after an initial charge of monomer by adding an initiator or initiator system to the aqueous phase. For example, peroxides can be used as free radical initiators. Specific examples of peroxide initiators include hydrogen peroxide, diacyl peroxides such as diacetyl peroxide, dipropionyl peroxide, dibutyryl peroxide, dibenzoyl peroxide, benzoylacetyl peroxide, diglutaric acid peroxide and dilauryl peroxide, and further water-soluble per-acids and water-soluble salts thereof such as for example ammonium, sodium or potassium salts. Examples of per-acids include peracetic acid, sodium peroxodisulfate, potassium peroxodisulfate or ammonium peroxodisulfate. Esters of the per-acid can be used as well and examples thereof include tertiary-butyl peroxyacetate and tertiary-butyl peroxypivalate. A further class of initiators that can be used are water-soluble azo-compounds. Suitable redox systems for use as initiators include for example a combination of peroxodisulfate and hydrogen sulphite or disulphite, a combination of thiosulfate and peroxodisulfate or a combination of peroxodisulfate and hydrazine. Alkali or earth alkali metal hydroxymethanesulfinates may be used in redox systems as well. Further initiators that can be used are ammonium-, alkali- or earth alkali salts of persulfates, permanganic or manganic acids. The amount of initiator employed is typically between 0.001 and 2% by weight, preferably between 0.005 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper, and silver may also be added.

During the initiation of the polymerization reaction, the sealed reactor kettle and its contents are conveniently preheated to the reaction temperature. Polymerization temperatures may be from 20° C., from 30° C., or even from 40° C. and may further be up to 100° C., up to 110° C., or even up to 150° C. The polymerization pressure may range, for instance, from 4 to 30 bar, in particular from 8 to 20 bar. The aqueous emulsion polymerization system may further comprise auxiliaries, such as buffers and complex-formers.

In one embodiment, a co-solvent may be used. Co-solvents are usually fluorinated organic liquids with boiling points of at least 30° C. In one embodiment, the polymerization is conducted in the absence of an organic solvent.

The amount of hydrofluoropolymer solids that can be obtained at the end of the polymerization is typically at least 10% by weight, or even at least 20% by weight, and up to 40% by weight, and even up to 45% by weight; and the average particle size (diameter) of the resulting fluoropolymer is typically between 30 nm and 500 nm, preferably between 55 nm to 250 nm.

In one embodiment, the resulting dispersion comprising the hydrofluoropolymer is substantially free of a non-aqueous solvent, meaning that less than 1% is present by weight based on the total weight of the dispersion.

In one embodiment, the resulting dispersion comprising the hydrofluoropolymer is substantially free of a solvent, meaning that less than 1% is present by weight based on the total weight of the dispersion.

In one embodiment, the resulting dispersion comprising the hydrofluoropolymer is substantially free of a fluorinated emulsifier, meaning that less than 0.1%, 0.05%, 0.01%, or even 0.001% or even none is present by weight of a fluorinated emulsifier based on the total weight of the dispersion.

The perhalogenated thermoplastic polymer can be polymerized as is known in the art. For example U.S. RE 40,902 (Kaulbach et al.), U.S. Pat. No. 6,686,426 (Kaulbach et al.) and U.S. Pat. No. 6,583,226 (Kaulbach et al.).

The isolated perhalogenated thermoplastic polymer may be post-fluorinated subsequent to the polymer workup. During post-fluorination, any unstable end groups such as carboxylic acid groups, COF groups, amide groups, and $-CF_2CH_2OH$ groups, which may during melt processing of the fluoropolymer decompose and form HF, can be converted into stable $CF_3$ groups. The post-fluorination may be conducted under conditions sufficient such that not more than 30, not more than 20, or even not more than 10 unstable end groups per million carbon atoms are present in the fluoropolymer. Accordingly, a highly inert fluoropolymer may thereby be obtained. Post-fluorination techniques are known in the art. Described in for example EP 222945 (Buckmaster et al.), U.S. Pat. No. 6,541,588 (Kaulbach), or DE 199 03 657 (Kaulbach et al.).

Alternatively, it might be beneficial for bonding purposes to avoid post-fluorination for the perhalogenated thermoplastic polymers; that means the content of $COO^-$ endgroups can be up to 2000 endgroups per million carbon atoms, preferably up to 1000 endgroups. It might be further beneficial to use comonomers with polar endgroups (e.g., $COO^-$, $SO_3^-$) so that the total amount of polar groups is up to 5000 groups per million carbon atoms. $COO^-$ groups are preferred. Such end-groups can be determined by FT-IR using the method as described in columns 4 and 5 of U.S. Pat. No. 4,743,658 (Imbalzano et al.).

Core-Shell Particles

In another embodiment, the composition comprises a core-shell having a first fluoropolymer portion, wherein the first fluoropolymer has an identical chemical structure of the perhalogenated thermoplastic polymer, which is encased by a second fluoropolymer portion, wherein the second fluoropolymer has an identical chemical structure of the hydrofluorothermoplastic described herein. Or alternatively, the composition comprises a core-shell having a first fluoropolymer portion, wherein the first fluoropolymer has an identical chemical structure of the hydrofluorothermoplastic, which is encased by a second fluoropolymer portion, wherein the second fluoropolymer has an identical chemical structure of the perhalogenated thermoplastic polymer.

The method for preparing the core-shell polymers is known in the art. Briefly, the reaction vessel is charged with a precharge of monomers, which is different than the feed composition. Then the initiator is added, initiating polymerization and the feed monomer is added during the polymerization to form the first polymer portion, or core. After a sufficient particle size is achieved, the polymerization of the core is stopped. The particles can be collected for subsequent processing or left in the reaction vessel, wherein the reaction vessel is again precharged with monomers, initiator added to initiate polymerization and the feed monomers for the shell are added into the reaction vessel. With this sequence, the second fluoropolymer portion or shell is formed.

In one embodiment of the core-shell polymer there is a distinct changeover from the chemical structure of the core polymer and that of the shell polymer. Such a structure may be obtained, for instance, by preparation of the core-shell polymer using a so-called seed latex. Alternatively, in another embodiment, the first fluoropolymer portion and the second fluoropolymer portion are separated by a portion wherein the chemical composition of the core is transitioning to the chemical composition of the shell. This transition portion may have a general chemical structure having some characteristics of the core polymer and some chemical characteristics of the shell polymer. The relative amount of these chemical characteristics in the transition region will change from heavily core-resembling near the core polymer to heavily shell-resembling near the shell polymer.

Properties

The composition of the present disclosure is a thermoplastic polymer, meaning it is an at least partially crystalline polymer that exhibits a melting point.

The composition of the present disclosure has one or two melting points of at least 150° C., 175° C., 200° C., or even at least 225° C. and typically no more than 290° C. The melting point(s) is/are preferred to be between 225° C. and 280° C.

In one embodiment, the composition of the present disclosure with a melting point in the range of 150-250° C. has a melt flow rate (MFR) of 1 to 100 g/10 min or even between 3 and 50 g/10 min at 297° C. with a 5 kilogram (kg) load. In another embodiment, the composition of the present disclosure with one or two melting point(s) above 250° C. has an MFR of 1 to 100 g/10 min or even between 3 and 50 g/10 min at 372° C. with a 5 kg load.

In one embodiment, the perhalogenated thermoplastic polymer of the present disclosure with a melting point in the range of 150-250° C. has a melt flow rate (MFR) of 1 to 100 g/10 min or even between 3 and 50 g/10 min at 297° C. with a 5 kilogram (kg) load. In another embodiment, the perhalogenated polymer of the present disclosure with a melting point above 250° C. has an MFR of 1 to 100 g/10 min or even between 3 and 50 g/10 min at 372° C. with a 5 kg load.

In one embodiment, the compositions of the present disclosure have a permeation constant at 60° C. with CE10 fuel of less than 3, 2.5, 2.2, 2.0, 1.8, or even 1.6 g mm $d^{-1} \cdot m^{-2}$ when measured as described in the Permeation Testing described in the Example Section. The fuel permeation constant is obtained by the following procedures. Namely, a sheet made of the fluorothermoplastic polymer is placed in a cup for the fuel permeation measurement containing a mixed solvent of CE10 fuel, which is Fuel C as specified in ASTM D471 blended with ethanol, such that the blend has 10.0±1.0% ethanol by volume (in other words a volume ratio of 45 isooctane, 45 toluene and 10 ethanol. The mass change was measured at 60° C. Based on the measured value, the fuel permeation constant is calculated.

Articles

The compositions of the present disclosure comprising the hydrofluorothermoplastic polymer and the perhalogenated thermoplastic polymer can be contacted with another material to form multilayer articles, such as that disclosed in FIG. 1, where 10 is a multilayer article comprising first polymer layer 12, which is the composition of the present disclosure (comprising the hydrofluorothermoplastic polymer and the perhalogenated thermoplastic polymer) and a second polymer layer 14, which is an elastomer. Optional additional polymer layer 16 is shown in FIG. 1 as being contacted with the first polymer layer 12, however, the additional polymer layer may be in contact with second polymer layer 14, or the same or different additional polymer layers may be adhered to both the first polymer layer and the second polymer layer.

The second polymer layer is an elastomer, which can be natural or synthetic. The elastomer may be fluorinated (comprising fluorine atoms) or non-fluorinated.

Fluorine-free elastomer include, for example, diene rubbers such as acrylonitrile-butadiene rubber (NBR) and its hydride (HNBR), styrene-butadiene rubber (SBR), chloroprene rubber (CR), butadiene rubber (BR), natural rubber (NR), and isoprene rubber (IR); ethene-propene-termonomer copolymer rubber, silicone rubber, butyl rubber, epichlorohydrin rubber, and acrylic rubbers.

Fluorinated elastomers include those known in the art, for example, copolymers comprising TFE, HFP, VDF and peroxide-curable (per)fluoroelastomers.

As disclosed in the cofiled application U.S. Pat. Publ. No. 2017-0226337, Chen et al., the hydrofluorothermoplastic polymer comprises pendent bromine groups, which are believed to improve the adhesion of the fluorothermoplastic layer with the elastomer layer, while maintaining a sufficient fuel permeation resistance. In the present disclosure, this hydrofluorothermoplastic polymer is mixed (either blended or in the form of a core-shell) with a perhalogenated thermoplastic, which has even better permeation resistance and/or adhesion to an elastomer layer.

In one embodiment, the first polymer layer is intimately contacted with the second polymer layer in the absence of an adhesive (or tie) layer such that the bonding interface between the first polymer layer and the second polymer layer consists essentially of a first material having the composition of the first polymer layer and a second material having the composition of the second polymer layer.

In another embodiment, the first polymer layer is intimately contacted with the second polymer layer in the presence of an adhesive (or tie) layer. Such adhesives are known in the art and include, for example, elastomers, such as a silicone elastomer, and fluoropolymers comprising TFE, HFP and VDF.

In one embodiment, the first polymer layer and the second polymer layer have an average peel strength when measured via a T-peel test in accordance to ASTM D-1876-08 using an Instron Model 5564 test machine with a crosshead speed of 300 mm/min of more than 2, 4, 6, 10, 15, or even 20 lbs/in (pounds per inch) (350, 700, 1050, 1751, 2627, or even 3503 Newton/meter).

As is known in the art, additives (such as antioxidants, fillers, etc.) can be added to the various polymer layers to improve, for example, their manufacture and/or final properties.

In one embodiment, an adhesion promoter may be added to the second polymer layer to improve the adhesion between the fluoropolymer layer and the elastomer.

Exemplary adhesion promoters include: 1,8-diazabicyclo(5.4.0)undec-7-ene salt (DBU salt), a 1,5-diazabicyclo(4.3.0)-non-5-ene salt (DBN salt), 1,8-diazabicyclo(5.4.0) undec-7-ene (DBU), and 1,5-diazabicyclo(4.3.0)-non-5-ene (DBN).

Examples of the DBU salt and the DBN salt include a carbonate, a long chain aliphatic carboxylate, an aromatic carboxylate, an orthophthalate, a p-toluenesulfonate, a phenoxide, a phenol resin salt, a naphthoate, an octoate, an oleate, a formate, and a phenolic novolac resin salt of DBU and DBN. The DBU or DBN salt is preferably at least one compound selected from the group consisting of 1,8-benzyl-1,8-diazabicyclo(5.4.0)-7-undecenium chloride (DBU-B), a naphthoate, an orthophthalate, a phenoxide, and a formate.

Exemplary adhesion promoters include: 1,8-diazabicyclo(5.4.0)undec-7-ene; 1,8-benzyl-1,8-diazabicyclo(5.4.0)-7-undecenium chloride; 1,8-diazabicyclo(5.4.0)undec-7-ene naphthoate, 1,8-diazabicyclo(5.4.0)undec-7-ene phenoxide; 1,8-diazabicyclo(5.4.0)undec-7-ene orthophthalate; and 1,8-diazabicyclo(5.4.0)undec-7-ene formate, tridodecylamine, trihexadecylamine, hexamethyldisilazane, tertiary amine/$BF_3$complex, and mixtures thereof.

Other classes of adhesion promoters include strong organic bases like phosphazenes or guanidines.

In one embodiment, the second polymer layer, comprising the elastomer is substantially free of an adhesion promoter, wherein substantially free means that the polymer comprises less than less than 0.1%, 0.05%, 0.01%, or even 0.001%.

In another embodiment, the first polymer layer may contain smectite layered clay minerals to further lower the fuel permeability. Exemplary minerals include montmorillonite, beidellite, saponite, nontronite, hectorite, hydrotalcite, sauconite, and stevensite, and/or fine layered minerals having high aspect ratio such as mica. Alternatively, the first polymer layer may be substantially free (i.e., less than 0.1%, 0.05%, 0.01%, or even 0.001%) of such materials.

With an aim of providing conductivity, in one embodiment, a conductive filler may be added to the first polymer layer as is known in the art. The conductive filler is not particularly limited, and examples thereof include a powdery or fibrous conductive elementary substance such as metals and carbons, powder of conductive compounds such as zinc oxide, and powder provided with electric conductivity by a surface treatment. Alternatively, the first polymer layer may be substantially free (i.e., less than 0.1%, 0.05%, 0.01%, or even 0.001%) of a conductive filler.

In one embodiment, the multilayer article of the present disclosure is produced by lamination of the elastomer and the composition of the present disclosure (the fluorothermoplastic polymer). In the laminate of the present disclosure, the elastomer layer may be laminated on both faces (or just one face) of the fluorothermoplastic polymer. In one embodiment, the fluorothermoplastic polymer layer may be laminated on both faces of the elastomer layer.

Lamination of the elastomer layer and the fluorothermoplastic polymer layer may be carried out by any method such as a method of laminating the elastomer layer and the fluorothermoplastic polymer layer, which have been separately formed, by pressure bonding and the like, a method of laminating the elastomer layer and the fluorothermoplastic polymer layer by simultaneously forming the both layers, and a method of applying the fluorothermoplastic polymer layer composition to the elastomer layer.

In the method of laminating the elastomer layer and the fluorothermoplastic polymer layer, which have been separately formed, by pressure bonding and the like, different methods may be employed to form layers respectively for the fluorothermoplastic polymer and the elastomer composition for vulcanization.

Formation of the fluorothermoplastic polymer layer may be carried out by shaping the composition for vulcanization into various shapes such as a sheet and a tube by heat compression molding, transfer molding, extrusion, injection, calendering, coating, or the like.

The fluorothermoplastic polymer layer may be formed by heat compression molding, melt-extrusion, injection, coating (including powder coating), or the like. Forming may be carried out by using a common forming machine for fluoropolymers such as an injection machine, a blow molding machine, an extrusion machine, and various coating machines. With such a machine, it is possible to produce laminates having various shapes such as a sheet and a tube. Among these methods, melt-extrusion is preferable because of its excellent productivity.

In one embodiment, another polymer layer is laminated on the fluorothermoplastic polymer layer, a forming method such as multilayer extrusion, multilayer blow molding, and multilayer injection may be employed to produce multilayer molded products such as multilayer tubes, multilayer hoses, and multilayer tanks.

Examples of the method of laminating the elastomer layer and the fluorothermoplastic polymer layer by simultaneously forming the both layers include a method of performing forming and laminating at the same time the elastomer layer and the fluorothermoplastic polymer layer by a method such as multilayer compression molding, multilayer transfer molding, multilayer extrusion, multilayer injection, or doubling.

The multilayer articles of the present disclosure comprise at least one elastomer layer and at least one fluorothermoplastic polymer layer of the present disclosure. In some embodiments, the multilayer article may comprise an additional polymer layer, 16.

The additional polymer layer may be a second elastomer layer, a plastic layer, or a fiber reinforcement layer. In addition, the elastomer layer and/or the fluorothermoplastic polymer layer may be further laminated by interposing additional polymer layer 16.

In one embodiment, additional polymer layer 16 is made of an elastomer other than the elastomer that is directly adhered to the fluorothermoplastic polymer layer, and the elastomer may be fluorinated or non-fluorinated (fluorine-free).

In one embodiment, additional polymer layer 16 is a plastic having excellent mechanical strength or a resin having low permeability to fuels and gas. Specific examples of the plastic having excellent mechanical strength include fluoroplastics (other than the fluorothermoplastic polymer of the present disclosure), polyamide resins, polyolefin resins, vinyl chloride resins, polyurethane resins, polyester resins, polyaramide resins, polyimide resins, polyamideimide resins, polyphenylene oxide resins, polyacetal resins, polycarbonate resins, acrylic resins, styrene resins, acrylonitrile/butadiene/styrene resins (ABS), cellulose resins, polyetheretherketone resins (PEEK), polysulfone resins, polyethersulfone resins (PES), and polyetherimide resins. Specific examples of the plastic having low permeability to fuels and gas include resins containing ethene/vinyl alcohol copolymers, polyphenylene sulfide resins, polybutylene naphthalate resins, polybutylene terephthalate resins, and polyphthalamide (PPA). Among these, polyamide resins are preferable because of their fine formability and adhesiveness. In the case where a laminate is subjected to vulcanization treatment, the melting point of the plastic is preferably higher than the temperature of the heat treatment.

Such multilayered articles disclosed here, which have good adhesion to other materials, while also having low fuel permeation, may be particularly useful in fuel applications, such as in fuel hoses. Because the fluorothermoplastic polymer composition of the present disclosure show chemically-firm adhesion to elastomers, special procedures for adhering are not needed, which allows easy forming at low cost. In addition, since a common forming method such as extrusion can be employed, thinner products can be produced so that the flexibility of the material is improved.

Exemplary embodiments of the present disclosure are described below:

Embodiment 1

A composition comprising
(i) a hydrofluorothermoplastic polymer, wherein the hydrofluorothermoplastic polymer is derived from:
 (a) 50-85 mol % tetrafluoroethene;
 (b) 2-15 mol % hexafluoropropene;
 (c) 10-35 mol % vinylidene fluoride; and
 (d) 0.1 to 5 mol % of a bromine-containing monomer; and
(ii) a perhalogenated thermoplastic polymer having a melting point of 150 to 315° C. with the ratio of the hydrofluorothermoplastic polymer to the perhalogenated thermoplastic polymer on a mass to mass basis of 10:90 and 90:10.

Embodiment 2

The composition according to embodiment 1, wherein the perhalogenated thermoplastic polymer is selected from FEP, PFA, and a homopolymer or copolymer comprising CTFE.

Embodiment 3

The composition of any one of the previous embodiments, wherein the composition comprises a blend of the hydrofluorothermoplastic polymer and the perhalogenated thermoplastic polymer.

Embodiment 4

The composition of any one embodiments 1-3, wherein the composition comprises a core-shell particle, wherein (i) the core comprises the perhalogenated thermoplastic polymer and the shell comprises the hydrofluorothermoplastic polymer or (ii) the core comprises the hydrofluorothermoplastic polymer and the shell comprises the perhalogenated thermoplastic polymer.

Embodiment 5

The composition of any one of the previous embodiments, wherein the bromine-containing monomer is fluorinated.

Embodiment 6

The composition of any one of the previous embodiments, wherein the bromine-containing monomer is selected from $F_2C=CHBr$, $F_2C=CFBr$, $H_2C=CH-CF_2-CF_2-Br$, $H_2C=CH-CF_2-Br$, $F_2C=CF-O-(CF_2)_x-Br$, $F_2C=CF-O-CF(CF_3)-CF_2-O-(CF_2)_x-Br$, $F_2C=CF-CF_2-O-(CF_2)_x-Br$, $H_2C=CH-CH_2-Br$, $F_2C=CF-O-CF_2-CFBr-CF_3$, and combinations thereof, where x is 2, 3, 4, or 5.

Embodiment 7

The composition of any one of the previous embodiments, wherein the hydrofluorothermoplastic polymer is further derived 0.1-5 mol % of a fluorinated allyl ether monomer and/or fluorinated vinyl ether monomer.

Embodiment 8

The composition of embodiment 7 wherein the fluorinated vinyl ether monomer is selected from perfluoro(methyl vinyl ether) (PMVE), perfluoro(ethyl vinyl ether) (PEVE), perfluoro(n-propyl vinyl ether) (PPVE-1), perfluoro(2-propoxypropyl vinyl ether) (PPVE-2), perfluoro(3-methoxy-n-propyl vinyl ether), perfluoro(2-methoxyethyl vinyl ether), $CF_3-(CF_2)_2-O-CF(CF_3)-CF_2-O-CF(CF_3)-CF_2-O-CF=CF_2$ (PPVE-3), and combinations thereof.

Embodiment 9

The composition of embodiment 7, wherein the fluorinated allyl ether monomer is selected from perfluoro(methyl allyl ether), perfluoro(ethyl allyl ether), perfluoro(n-propyl allyl ether), perfluoro(2-propoxypropyl allyl ether), perfluoro(3-methoxy-n-propyl allyl ether), perfluoro(2-methoxyethyl allyl ether), $CF_3-(CF_2)_2-O-CF(CF_3)-CF_2-O-CF(CF_3)-CF_2-O-CF_2CF=CF_2$, and combinations thereof.

Embodiment 10

The composition of any one of the previous embodiments, wherein the composition has a permeation constant of less than 2.5 g mm/m$^2$ d when measured at 60° C. with CE10 fuel.

Embodiment 11

A multilayer article comprising:
a first polymer layer comprising the composition of any one of embodiments 1-10; and
a second polymer layer wherein the second polymer layer is an elastomer wherein the first polymer layer is intimate contact with the second polymer layer.

Embodiment 12

The multilayer article of embodiment 11, wherein a bonding interface between the first polymer layer and the second polymer layer consists essentially of a first material having the composition of the first polymer layer and a second material having the composition of the second polymer layer.

Embodiment 13

The multilayer article of any one of embodiments 11-12, wherein the second polymer layer comprises an adhesion promoter.

Embodiment 14

The multilayer article of embodiment 13, wherein the adhesion promoter is selected from: DBU, a DBU salt, DBN, a DBN salt, and mixtures thereof.

Embodiment 15

The multilayer article of any one of embodiments 11-12, wherein the second polymer layer is substantially free of an adhesion promoter.

Embodiment 16

The multilayer article of any one of embodiments 11-15, wherein the first polymer layer and the second polymer layer have a peel strength of at least 1 lb/in.

Embodiment 17

The multilayer article of any one of embodiments 11-16, wherein a bonding interface between the first polymer layer and the second polymer layer comprises a tie layer.

Embodiment 18

The multilayer article of any one of embodiments 11-16, wherein the elastomer comprises an acrylonitrile-butadiene elastomer or a hydrogenated elastomer thereof, a blended elastomer of acrylonitrile-butadiene elastomer and poly(vinyl chloride), a fluorine-containing elastomer, an epichlorohydrin elastomer, an ethene-propene elastomer, a chlorosulfonated polyethene elastomer, or an acrylic elastomer.

Embodiment 19

The multilayer article of any one of embodiments 11-18, further comprising a third layer, wherein the third layer is bonded to the first polymer layer or the second polymer layer.

Embodiment 20

The multilayer article of any one of embodiments 11-19, wherein the multilayer article is a hose.

Embodiment 21

A method of making a composition comprising:
(i) providing a first latex comprising a hydrofluorothermoplastic polymer derived from:
   (a) 50-85 mol % tetrafluoroethene;
   (b) 2-15 mol % hexafluoropropene;
   (c) 10-35 mol % vinylidene fluoride monomer, and
   (d) 0.1 to 5 mol % of a bromine-containing; and
(ii) providing a second latex comprising a perhalogenated thermoplastic polymer having a melting point of 150 to 315° C.;
(iii) combining the first latex and the second latex to form a latex blend; and
(iv) further processing the latex blend to form a dry powder.

Embodiment 22

A method of making a composition comprising:
(i) providing a first polymer comprising a hydrofluorothermoplastic polymer derived from:
   (a) 50-85 mol % tetrafluoroethene;
   (b) 2-15 mol % hexafluoropropene;
   (c) 10-35 mol % vinylidene fluoride; and
   (d) 0.1 to 5 mol % of a bromine-containing; and
(ii) providing a second polymer comprising a perhalogenated thermoplastic polymer having a melting point of 150 to 315° C.; and
(iii) combining the first polymer and the second polymer to form a mixture; and
(iv) melting the mixture to form a melt blend.

Embodiment 23

A method of making a composition comprising:
(i) providing a core comprising a perhalogenated thermoplastic polymer having a melting point of 150 to 315° C.;
(ii) polymerizing around the core, a shell comprising a hydrofluorothermoplastic polymer derived from:
   (a) 50-85 mol % tetrafluoroethene;
   (b) 2-15 mol % hexafluoropropene;
   (c) 10-35 mol % vinylidene fluoride; and
   (d) 0.1 to 5 mol % of a bromine-containing monomer.

Embodiment 24

The method of making according to embodiment 23, wherein the ratio of the core to the shell on a mass to mass basis is 10:90 and 90:10.

Embodiment 25

The method of any one of embodiments 23-24, wherein there is an abrupt change between the chemical structure of the core and the shell.

Embodiment 26

A method of making a composition comprising:
(i) providing a core comprising a hydrofluorothermoplastic polymer derived from:
   (a) 50-85 mol % tetrafluoroethene;
   (b) 2-15 mol % hexafluoropropene;
   (c) 10-35 mol % vinylidene fluoride; and
   (d) 0.1 to 5 mol % of a bromine-containing monomer
(ii) polymerizing around the core, a shell comprising a perhalogenated thermoplastic polymer having a melting point of 150 to 315° C.

Embodiment 27

The method of making according to embodiment 26, wherein the ratio of the core to the shell on a mass to mass basis is 10:90 and 90:10.

Embodiment 28

The method of any one of embodiments 26-27, wherein there is an abrupt change between the chemical structure of the core and the shell.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, hr=hour, kg=kilograms, min=minute, mol=mole, ml=milliliter, L=liter, rpm=revolutions per minute, pphr=pounds per hundred rubber, and wt=weight.

Methods

MFR

The melt flow rate (MFR), reported in g/10 min, was measured following a similar procedure as described in DIN EN ISO 1133-1:2012-03 at a support weight of 5.0 kg and a temperature of 297° C. The MFR was obtained with a standardized extrusion die of 2.1 mm in diameter and a length of 8.0 mm.

Melting Point

The melting point of the fluorothermoplastic polymer was determined using differential scanning calorimetry following a similar procedure as described in ASTM D4591-07 (2012) using a PerkinElmer Pyris 1 DSC (Waltham, Mass.) under nitrogen flow with a heating rate of 10° C./min. The reported melting points relate to the melting peak maximum.

Particle Size

The latex particle size determination was conducted by means of dynamic light scattering with a Malvern Zetasizer 1000HSA (Worchestershire, UK) following a similar procedure as described in DIN ISO 13321:2004-10. The reported average particle size is the z-average. Prior to the measurements, the polymer latexes as yielded from the polymerizations were diluted with 0.001 mol/L KCl-solution. The measurement temperature was 20° C. in all cases.

Film Preparation:

Films of the fluoropolymer blends in Examples 1-3 and of CE D and CE E for peel testing and of Example 2 for permeation testing were made by placing approximately 6 g of each agglomerate between polyimide sheets. These sheets were then placed in a Vogt vacuum press (Berlin, Germany) set at 270° C. Vacuum was started and for the first 60 seconds no pressure was applied, in the next 30 seconds 2-5 bar pressure was applied, in the last 30 seconds a pressure between 15-20 bars was applied. The sheets were removed from the press and allowed to air cool. In this manner, depending on the MFI of the fluoropolymer blend, plaques with a diameter between 10-15 cm with a thickness of 150-300 μm (micrometers) were produced. The thickness of the films of Example 2 for permeation testing were between 250-330 μm.

Film of CE A for the permeation and peel testing was produced by conventional extrusion methods. The extrusion set-up comprised a 30 mm single screw (screw length 750 mm) extruder (available from Collin GmbH, Ebersberg, Germany) equipped with a 320 mm width film die (available from Breyer GmbH, Singen, Germany) and a 3-roll calender (available from Collin GmbH, Ebersberg, Germany). The temperature profile in the extruder was 250° C., 270° C., 275° C., 275° C. from Zone 1 to Zone 4 respectively. The temperature of the flange was 285° C., and the die and lip were both 280° C. A filter pack of 1000/500/200 μm was employed. Film was extruded at a screw speed of 18 rpm, and the 3-roll stack temperature was maintained at 120° C. with a separation between the die and 3-roll stack of 80 mm. Film of 260 mm width and 250 μm thickness was produced at a line speed of approximately 0.4 m/min.

Film of CE B for permeation testing was made by employing a hydraulic press (available from Wabash MPI, Wabash IN) preheated to 300° C. Two large smooth metal plates were placed into the press to preheat. The film was made by using a 27.9 cm×15.2 cm×0.25 mm frame mold with two 10.2 cm diameter cutouts. The frame was placed onto a polyimide sheet and approximately 4 g of material was place into the center of each cutout on the polyimide sheet. A second polyimide sheet was placed over the frame mold. The mold assembly was then inserted between the two metal plates in the hydraulic press. After approximately 3 minutes, about 21 bar was applied and held for 1 minute. Then the mold assembly continued to be held under pressure as water cooling reduced the temperature of the platens to below 100° C. The mold assembly was removed from the press and allowed to air cool. In this manner, films of diameter about 10 cm with a thickness of 250 μm were produced.

Film of CE B for peel testing was made similarly as for permeation testing with the following exceptions. Approximately 20-22 g of the material was placed between polyimide sheets. The sheets were then placed in the preheated hydraulic press. After 4 minutes, a load of 10 tons was applied and held for 2 minutes which is equivalent to approximately 110 bar pressure dependent on the final film diameter. The sheets were removed from the press and placed between two metal plates at room temperature and allowed to cool. In this manner, films of diameter about 10 cm with a thickness of 250-350 μm were produced.

Film of CE C for permeation and peel testing was produced similarly as CE A with the exception that a 30 mm Ide single screw extruder (available from Bernhard Ide GmbH & Co. KG, Ostfildern, Germany) was used. The temperature profile in the extruder was 290° C., 315° C., 330° C., 340° C. from Zone 1 to Zone 4 respectively. The temperature for the flange was 350° C. and 370° C. for both the die and the lip. The 3-roll stack temperature was maintained at 190° C. for the first roll and 140° C. for the other rolls. A separation between the die and 3-roll stack of 50 mm was maintained. Film of 230 mm width and 250 μm thickness was produced at a line speed of approximately 0.7 m/min.

Film of CE E for permeation testing was prepared by skiving in the following manner. Approximately 300-350 g of the fluoropolymer agglomerate were melted in an oven set at 300° C. for 2 hours. When the agglomerate was completely melted, it was poured into a mold. The mold was placed in a press set at room temperature, and a staged pressing cycle was employed, 30 minutes at 250 bar, 20 minutes at 150 bar and 10 minutes at 10 bar. The mold was allowed to cool to room temperature overnight. The resultant pressed block with a diameter of 4.5 cm and approximately a height of 10 cm was then skived on a lathe set with a blade to achieve the desired thickness. Skived films of 250 μm thickness were thus produced.

Permeation Constant:

Permeation constants were determined in accordance to SAE J2665 Test Procedure to Measure the Fuel Permeability of Materials by the Cup Weight Loss Method issued October 2006 with the following changes and details. Perfluoroelastomer gaskets were used and made by conventional methods from the following compound:

100 pphr perfluoroelastomer (available under the trade designation "3M DYNEON PFE 90Z", from 3M Co., St. Paul, Minn.)

15 pphr N990 MT carbon black (available under the trade designation "THERMAX N990" from Cancarb, Canada)

5 pphr Zinc Oxide USP-1 (available from HallStar, Chicago, Ill.)
1.5 pphr peroxide (available under the trade designation "VAROX DBPH-50" available from Vanderbilt Chemicals Corp., Murray, Ky.)
2.5 pphr co-agent (available under the trade designation "TAIC DLC-A", 72% active available from Harwick Standard Distribution Corp., Itasca, Ill.)

The test fluid was 100 ml of Fuel CE10 (10% ethanol, 45% iso-octane, 45% toluene by volume). The test temperature was 60° C. The result(s) for each sample are reported.

Peel Strength

Sample Preparation:

Nitrile rubber compound was prepared by conventional methods with a two-roll mill by compounding the following 100 pphr butadiene-acrylonitrile copolymer (available under the trade designation "NIPOL DN3350" from Zeon Chemicals, Louisville, Ky.)
60 pphr N-762 carbon black (available from Cabot Corp., Billerica, Mass.)
3.5 pphr dicumyl peroxide (available under the trade designation "DI-CUP 40KE" from GEO Specialty Chemicals)
5 pphr calcium hydroxide (available from The C.P. Hall Company)
5 pphr calcium oxide (available from HallStar)
2 pphr stearic acid (available from Aldrich)
5 pphr dioctyl phthalate (available from Aldrich)
1 pphr 1,8-Diazabicyclo[5.4.0]undec-7-ene (DBU, available from Spectrum Chemicals—TCI)

A sheet about 3.5 mm thick was formed from the nitrile rubber compound by using the two-roll mill.

To make the nitrile rubber-fluoropolymer laminates for peel testing, sections approximately 2.5 cm×7.5 cm were cut from the nitrile sheet. Sections approximately 2.5 cm×7.5 cm were also cut from the fluoropolymer film. Laminates were molded using a frame mold with 2.5 cm×7.5 cm×0.35 cm cavities preheated to 177° C. The mold was placed on a sheet of polyester release film. One section of fluoropolymer film was placed in the bottom of each mold cavity, a 2.5 cm×2.5 cm piece of polyester release film was placed over one end of each fluoropolymer film to create a tab for peel testing, and then one nitrile rubber section was placed into each mold cavity over the fluoropolymer film. Another sheet of polyester release film was placed over the mold. The mold was placed into the preheated hydraulic press and held under 24 bars pressure for 60 minutes. The mold was removed from the press, allowed to cool to room temperature and then disassembled. The polyester film did not adhere to the fluoropolymer or the NBR compound and could be removed easily. The polyester release tabs were also removed prior to peel testing.

Peel strength of the nitrile rubber-fluoropolymer laminated samples were measured via a T-peel test in accordance to ASTM D-1876-08 using an Instron Model 5564 test machine with a crosshead speed of 300 mm/min. The result(s) for each sample are reported. Unless otherwise noted, the mode of failure is adhesion failure between the layers. If the tab of the laminate held by the grip of the test machine broke during the test without any separation between the layers, the peak load was used to calculate the peel strength and is noted in table.

Example 1

A copolymer of TFE, HFP, VDF, PPVE-1, and BTFB was prepared as follows:

A polymerization kettle with a total volume of 50 L equipped with an impeller agitator system was charged with 27 L deionized water, 2 g oxalic acid, 12 g ammonium oxalate, and 270 g of a 30 mass % aqueous solution of ammonium 4,8-dioxa-3-H-perfluorononanoate ($CF_3$—O—($CF_2$)$_3$—O—CFH—$CF_2$—COONH$_4$, prepared as in "Preparation of Compound 11" in U.S. Pat. No. 7,671,112). The oxygen-free kettle was then heated up to 60° C. and the agitation system was set to 240 rpm. The kettle was charged with 0.63 bar ethane, 17 g PPVE-1, and 1.4 kg hexafluoropropene (HFP) to a pressure of 10.2 bar absolute, with 50 g vinylidene difluoride (VDF) to 11.0 bar absolute and with 425 g tetrafluoroethene (TFE) to 17.0 bar absolute reaction pressure. The polymerization was initiated by the addition of 29 g of a 1.0% aqueous potassium permanganate ($KMnO_4$) solution and a continuous feed of $KMnO_4$-solution was maintained with a feed rate of 72 g/hr. As the reaction starts, the reaction temperature of 60° C. was maintained and the reaction pressure of 17.0 bar absolute was maintained by feeding TFE, VDF, HFP, PPVE-1, and BTFB into the gas phase with monomer mole fractions of $x_{TFE}$=0.785, $x_{VDF}$=0.152, $x_{HFP}$=0.043, $x_{PPVE-1}$=0.015, and $x_{BTFB}$=0.005.

When a total feed of 12.3 kg TFE was reached in 390 min, the feed of the monomers was interrupted by closing the monomer valves. Then the reactor was vented and flushed with $N_2$ in three cycles.

The so-obtained 44.8 kg polymer dispersion, having a solid content of 34.9 mass % and latex particles with 72 nm in diameter according to dynamic light scattering, was removed at the bottom of the reactor. The dispersion was stirred in presence of Dowex Monosphere 650C cation exchange resin (Dow Chemical Co., Midland, Mich.) followed by removal of the cation exchange resin from the dispersion.

A latex blend of the above-described BTFB-containing polymer and an FEP copolymer was prepared as follows:

A beaker equipped with an impeller agitator system was charged with 290 g of the aqueous dispersion described above and 750 g of a 26.8 mass % aqueous dispersion of an FEP copolymer (comprising 11.5 wt % HFP based on the total weight of the polymer as measured similarly to the method described in U.S. Pat. No. 6,686,426, data of the dry copolymer: melting point=252° C., MFR (372° C./5 kg)=22 g/10 min). The pH was adjusted to 2 by the addition of hydrochloric acid (30 wt % solution). The agitation system was set to 500 rpm for 2 min at ambient temperature. After precipitation and agglomeration, the polymer was dried at 120° C. The thus obtained 300 g polymer showed the physical properties given in table 1.

Example 2

A copolymer of TFE, HFP, VDF, PPVE-1, and BTFB was prepared in the same manner as in Example 1 except that the kettle was charged with 0.63 bar ethane and that the monomer feed mole fractions were adjusted to $x_{TFE}$=0.785, $x_{VDF}$=0.152, $x_{HFP}$=0.038, $x_{PPVE-1}$=0.015, and $x_{BTFB}$=0.010. The supply of monomers was interrupted after feeding 8.5 kg TFE in 360 min. 39.5 kg polymer dispersion were obtained with a solid content of 27.4 mass % and latex particles with 65 nm in diameter.

A latex blend of the BTFB-containing polymer and an FEP copolymer was prepared in the same manner as in Example 1 except that 460 g of the aqueous dispersion described above and 360 g of the 34.4 mass % aqueous dispersion of an FEP copolymer (comprising 11.5 wt % HFP and 1.0 wt % PPVE-1 based on the total weight of the polymer, data of the dry copolymer: melting point=255° C., MFR (372° C./5 kg)=9 g/10 min) were used. The physical properties of the obtained 250 g polymer are given in table 1.

Example 3

A latex blend of the BTFB-containing polymer described in example 2 and an FEP copolymer was prepared in the same manner as in Example 1 except that 310 g of the aqueous dispersion described in Example 2 and 480 g of the 34.4 mass % aqueous dispersion of an FEP copolymer (comprising 11.5 wt % HFP and 1.0 wt % PPVE-1 based on the total weight of the polymer data of the dry copolymer: melting point=255° C., MFR (372° C./5 kg)=9 g/10 min; 3M Co., St. Paul, Minn.) were used. The physical properties of the obtained polymer are given in table 1.

Comparative Example A (CE A)

A copolymer of TFE, HFP, VDF, and PPVE-1 was prepared as follows:

A polymerization kettle with a total volume of 50 l equipped with an impeller agitator system was charged with 28 L deionized water, 2 g oxalic acid, 12 g ammonium oxalate, and 210 g of a 30 mass % aqueous solution of ammonium 4,8-dioxa-3-H-perfluorononanoate. The oxygen-free kettle was then heated up to 60° C. and the agitation system was set to 240 rpm. The kettle was charged with 0.36 bar ethane, with PPVE-1 to a pressure of 1.14 bar absolute, with HFP to a pressure of 8.5 bar absolute, with VDF to 9.8 bar absolute and with TFE to 15.5 bar absolute reaction pressure. The polymerization was initiated by the addition of 9 ml of a 2.6% aqueous potassium permanganate ($KMnO_4$) solution and a continuous feed of $KMnO_4$-solution was maintained with a feed rate of 28 mL/hr. As the reaction starts, the reaction temperature of 60° C. was maintained and the reaction pressure of 15.5 bar absolute was maintained by feeding TFE, VDF, HFP, and PPVE-1 into the gas phase with monomer feed mole fractions of $x_{TFE}$=0.724, $x_{VDF}$=0.192, $x_{HFP}$=0.069, and $x_{PPVE-1}$=0.015.

When a total feed of 10.4 kg TFE was reached in 278 min, the feed of the monomers was interrupted by closing the monomer valves. Within 10 min, the monomer gas phase was reacted down to a kettle pressure of 10.9 bar. Then the reactor was vented and flushed with $N_2$ in three cycles.

The so-obtained 41.7 kg polymer dispersion, having a solid content of 34.1 mass % and latex particles with 98 nm in diameter according to dynamic light scattering, was removed at the bottom of the reactor. The dispersion was stirred in presence of Dowex Monosphere 650C cation exchange resin followed by removal of the cation exchange resin from the dispersion. The dispersion was subsequently agglomerated and dried for 16 hr at 120° C. to give 14.2 kg dry polymer. The physical properties of the polymer are shown in table 1 below.

Comparative Example B (CE B)

CE B is an FEP copolymer (available under the trade designation "3M™ DYNEON™ FLUOROPLASTIC POWDER FEP 6322PZ", by 3M Co., St. Paul, Minn.).

Comparative Example C (CE C)

54.4.2 kg of an FEP copolymer (available under the trade designation "3M™ DYNEON™ FLUOROPLASTIC GRANULES FEP 6307Z", by 3M Co., St. Paul, Minn.) and 25.6 kg of a pelletized version of Comparative Example A were tumble blended (Mortar Mixer 25 CPM available from Stone) for 15 minutes. The blended pellets were fed at a rate of 200 lbs/hr into a twin screw extruder (40 ZSK available from Coperion, Ramsey N.J.) equipped with screws of diameter 40 mm with kneader elements and L/D of 37/1. The temperature profile of the extruder was 266° C., 354° C., 360° C., 360° C. for Zones 1 to 4 respectively, 366° C. for Zones 5-9 and the transition zones, and 371° C. for the 4-hole strand die. A 100 mesh screen pack was employed and vacuum was used in Zone 8 at 7 mm Hg. The blend was compounded with the extruder running at 250 rpm. Extruded strands were cooled in a 2.6-meter long 27° C. water bath (available from Reduction Engineering Scheer, Kent Ohio), dried via an air wipe and then pelletized (Model 6D4C-DU Pelletizer available from Reduction Engineering Scheer, Kent Ohio) at 330 rpm. A total of 67 kg was produced. The physical properties of the polymer are shown in table 1.

Comparative Example D

A copolymer of TFE, HFP, VDF, PPVE-1, and BTFB was prepared as follows:

A polymerization kettle with a total volume of 50 L equipped with an impeller agitator system was charged with 27 L deionized water, 2 g oxalic acid, 12 g ammonium oxalate, and 270 g of a 30 mass % aqueous solution of ammonium 4,8-dioxa-3-H-perfluorononanoate ($CF_3$—O—($CF_2$)$_3$—O—CFH—$CF_2$—COONH$_4$, prepared as in "Preparation of Compound 11" in U.S. Pat. No. 7,671,112). The oxygen-free kettle was then heated up to 60° C. and the agitation system was set to 240 rpm. The kettle was charged with 0.63 bar ethane, 17 g PPVE-1, and 1.4 kg hexafluoropropene (HFP) to a pressure of 10.2 bar absolute, with 50 g vinylidene difluoride (VDF) to 11.0 bar absolute and with 425 g tetrafluoroethene (TFE) to 17.0 bar absolute reaction pressure. The polymerization was initiated by the addition of 29 g of a 1.0% aqueous potassium permanganate ($KMnO_4$) solution and a continuous feed of $KMnO_4$-solution was maintained with a feed rate of 72 g/hr. As the reaction starts, the reaction temperature of 60° C. was maintained and the reaction pressure of 17.0 bar absolute was maintained by feeding TFE, VDF, HFP, PPVE-1, and BTFB into the gas phase with monomer mole fractions of $x_{TFE}$=0.785, $x_{VDF}$=0.152, $x_{HFP}$=0.043, $x_{PPVE-1}$=0.015, and $x_{BTFB}$=0.005.

When a total feed of 12.3 kg TFE was reached in 390 min, the feed of the monomers was interrupted by closing the monomer valves. Then the reactor was vented and flushed with N2 in three cycles.

The so-obtained 44.8 kg polymer dispersion had a solid content of 34.9 mass % (15.6 kg of dry polymer) and latex particles with 72 nm in diameter according to dynamic light scattering, was removed at the bottom of the reactor. The dispersion was stirred in presence of Dowex Monosphere 650C cation exchange resin (Dow Chemical Co., Midland, Mich.) followed by removal of the cation exchange resin from the dispersion. The dispersion was subsequently coagulated, agglomerated, and dried for 16 hr at 120° C. to give 18.0 kg dry polymer. The physical properties of the polymer are shown in Table 1 below.

Comparative Example E

A copolymer was prepared in the same manner as in Comparative Example D except that the kettle was charged with 0.63 bar ethane and that the monomer feed mole fractions were adjusted to $x_{TFE}$=0.785, $x_{VDF}$=0.152, $x_{HFP}$=0.038, $x_{PPVE-1}$=0.015, and $x_{BTFB}$=0.010. The supply of monomers was interrupted after feeding 8.5 kg TFE in 360 min. 39.5 kg polymer dispersion were obtained with a solid content of 27.4 mass % (10.8 kg of dry polymer) and latex particles with 65 nm in diameter.

TABLE 1

|  | CE A | CE B | CE C | CE D | CE E | Ex 1 | Ex 2 | Ex 3 |
|---|---|---|---|---|---|---|---|---|
| Ratio of FEP to hydrofluoropolymer | NA | NA | 68:32 | NA | NA | 2:1 | 1:1 | 2:1 |
| Melting point maximum)/° C. | 224 | 252 | 243 | 242 | 237 | 239 | 241 | 243 |
| MFR(297° C./5 kg)/ (g/10 min) | 28 | 22[1] | 1.4[2] | 3.8 | 0.8 | 1.7 | 2.1 | 6.6 |
| permeation constant (60° C., CE10 fuel)/ (g · mm · d$^{-1}$ · m$^{-2}$) | 2.7, 2.9, 3.0 | 0.3, 0.4, 0.3 | 0.5, 0.6, 0.5 | NT | 1.6, 1.8 | NT | 0.8, 0.9 | NT |
| Peel test (lbs/in) | 21*, 22* | no bonding | 4, 5 | 4, 4, 6 | 11, 6, 34* | 2.5, 1.3 | 42^, 42^, 39^ | 43^, 37^ |

NA means not applicable
NT means not tested
[1]MFR tested at 372° C.
[2]MFR tested at 265° C.
^denotes separation of the laminate via cohesive failure of the nitrile rubber
*denotes tab failure without layer separation during testing Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A composition comprising
   (i) a hydrofluorothermoplastic polymer, wherein the hydrofluorothermoplastic polymer is derived from:
      (a) 50-85 mol % tetrafluoroethene;
      (b) 2-15 mol % hexafluoropropene;
      (c) 10-35 mol % vinylidene fluoride; and
      (d) 0.1 to 5 mol % of a bromine-containing monomer; and
   (ii) a perhalogenated thermoplastic polymer having a melting point of 150 to 315° C. with the ratio of the hydrofluorothermoplastic polymer to the perhalogenated thermoplastic polymer on a mass to mass basis of 10:90 and 90:10 and wherein the composition has a permeation constant of less than 2.5 g mm/m² d when measured at 60° C. with CE10 fuel.

2. The composition according to claim 1, wherein the perhalogenated thermoplastic polymer is selected from FEP, PFA, and a homopolymer or copolymer comprising CTFE.

3. The composition of claim 1, wherein the composition comprises a blend of the hydrofluorothermoplastic polymer and the perhalogenated thermoplastic polymer.

4. The composition of claim 1, wherein the composition comprises a core-shell particle, wherein (i) the core comprises the perhalogenated thermoplastic polymer and the shell comprises the hydrofluorothermoplastic polymer or (ii) the core comprises the hydrofluorothermoplastic polymer and the shell comprises the perhalogenated thermoplastic polymer.

5. The composition of claim 1, wherein the hydrofluorothermoplastic polymer is further derived 0.1-5 mol % of a fluorinated allyl ether monomer and/or fluorinated vinyl ether monomer.

6. The composition of claim 1, wherein the bromine-containing monomer is fluorinated.

7. The composition of claim 1, wherein the bromine-containing monomer is selected from $F_2C=CHBr$, $F_2C=CFBr$, $H_2C=CH-CF_2-CF_2-Br$, $H_2C=CH-CF_2-Br$, $F_2C=CF-O-(CF_2)_x-Br$, $F_2C=CF-O-CF(CF_3)-CF_2-O-(CF_2)_x-Br$, $F_2C=CF-CF_2-O-(CF_2)_x-Br$, $H_2C=CH-CH_2-Br$, $F_2C=CF-O-CF_2-CFBr-CF_3$, and combinations thereof, where x is 2, 3, 4, or 5.

8. The composition of claim 5, wherein the fluorinated vinyl ether monomer is selected from perfluoro(methyl vinyl ether) (PMVE), perfluoro(ethyl vinyl ether) (PEVE), perfluoro(n-propyl vinyl ether) (PPVE-1), perfluoro(2-propoxypropyl vinyl ether) (PPVE-2), perfluoro(3-methoxy-n-propyl vinyl ether), perfluoro(2-methoxyethyl vinyl ether), $CF_3-(CF_2)_2-O-CF(CF_3)-CF_2-O-CF(CF_3)-CF_2-O-CF=CF_2$ (PPVE-3), and combinations thereof.

9. The composition of claim 5, wherein the fluorinated allyl ether monomer is selected from perfluoro(methyl allyl ether), perfluoro(ethyl allyl ether), perfluoro(n-propyl allyl ether), perfluoro(2-propoxypropyl allyl ether), perfluoro(3-methoxy-n-propyl allyl ether), perfluoro(2-methoxyethyl allyl ether), $CF_3-(CF_2)_2-O-CF(CF_3)-CF_2-O-CF(CF_3)-CF_2-O-CF_2CF=CF_2$, and combinations thereof.

10. A multilayer article comprising:
   a first polymer layer comprising the composition of claim 1; and
   a second polymer layer wherein the second polymer layer is an elastomer
   wherein the first polymer layer is intimate contact with the second polymer layer.

11. The multilayer article of claim 10, wherein a bonding interface between the first polymer layer and the second polymer layer consists essentially of a first material having the composition of the first polymer layer and a second material having the composition of the second polymer layer.

12. The multilayer article of claim 10, wherein the first polymer layer and the second polymer layer have a peel strength of at least 1 lb/in.

13. The multilayer article of claim 10, further comprising a third layer, wherein the third layer is bonded to the first polymer layer or the second polymer layer.

14. The multilayer article of claim 10, wherein the multilayer article is a hose.

15. A method of making a composition comprising:
(i) providing a first latex comprising a hydrofluorothermoplastic polymer derived from:
  (a) 50-85 mol % tetrafluoroethene;
  (b) 2-15 mol % hexafluoropropene;
  (c) 10-35 mol % vinylidene fluoride monomer; and
  (d) 0.1 to 5 mol % of a bromine-containing monomer; and
(ii) providing a second latex comprising a perhalogenated thermoplastic polymer having a melting point of 150 to 315° C.;
(iii) combining the first latex and the second latex to form a latex blend; and
(iv) further processing the latex blend to form a dry powder.

16. A method of making a composition comprising:
(i) providing a core comprising a perhalogenated thermoplastic polymer having a melting point of 150 to 315° C.;
(ii) polymerizing around the core, a shell comprising a hydrofluorothermoplastic polymer derived from:
  (a) 50-85 mol % tetrafluoroethene;
  (b) 2-15 mol % hexafluoropropene;
  (c) 10-35 mol % vinylidene fluoride; and
  (d) 0.1 to 5 mol % of a bromine-containing monomer.

17. A method of making a composition comprising:
(i) providing a core comprising a hydrofluorothermoplastic polymer derived from:
  (a) 50-85 mol % tetrafluoroethene;
  (b) 2-15 mol % hexafluoropropene;
  (c) 10-35 mol % vinylidene fluoride; and
  (d) 0.1 to 5 mol % of a bromine-containing monomer
(ii) polymerizing around the core, a shell comprising a perhalogenated thermoplastic polymer having a melting point of 150 to 315° C.

* * * * *

UNITED STATES PATENT AND TRADEMARK OFFICE
CERTIFICATE OF CORRECTION

PATENT NO. : 10,227,484 B2  
APPLICATION NO. : 15/503098  
DATED : March 12, 2019  
INVENTOR(S) : Lisa Chen Page 1 of 1

It is certified that error appears in the above-identified patent and that said Letters Patent is hereby corrected as shown below:

In the Specification

Column 6,
Line 51, delete "$C_2Hs$," and insert -- $C_2H_5$, --, therefor.

Column 8,
Line 12, delete
"$X_2C=CX(CF_2)_m(CH_2)_n[O—(CX_2)_p]_q—[O—(CX_2)_r]_s—[(O)—(CX_2—CX_2)]_t—[(O)_w—(CX_2)_u]_v—[CH_2]_z—Y$" and insert
-- $X_2C=CX(CF_2)_m(CH_2)_n[O-(CX_2)_p]_q-[O-(CX_2)_r]_s-[O-(CX_2-CX_2)]_t-[(O)_w-(CX_2)_u]_v -[CH_2]_z-Y$ --, therefor.

Column 8,
Line 32, delete "$CF_2CF—$" and insert -- $CF_2=CF—$ --, therefor.

Column 17,
Line 54, delete "monomer," and insert -- monomer; --, therefor.

Signed and Sealed this  
Thirteenth Day of August, 2019

Andrei Iancu  
*Director of the United States Patent and Trademark Office*